(12) United States Patent
Haverstock et al.

(10) Patent No.: US 7,082,475 B2
(45) Date of Patent: *Jul. 25, 2006

(54) WEB SERVER WITH AUTOMATED WORKFLOW

(75) Inventors: Paul Haverstock, Acton, MA (US); Miguel Estrada, Nashua, NH (US); Julio Estrada, Carlisle, MA (US)

(73) Assignee: International Business Machines Corporation, Armonk, NY (US)

( * ) Notice: Subject to any disclaimer, the term of this patent is extended or adjusted under 35 U.S.C. 154(b) by 105 days.

This patent is subject to a terminal disclaimer.

(21) Appl. No.: 09/100,129

(22) Filed: Jun. 19, 1998

(65) Prior Publication Data

US 2002/0038357 A1    Mar. 28, 2002

Related U.S. Application Data

(60) Provisional application No. 60/050,153, filed on Jun. 19, 1997, provisional application No. 60/050,154, filed on Jun. 19, 1997, provisional application No. 60/050,155, filed on Jun. 19, 1997.

(51) Int. Cl.
G06F 15/16 (2006.01)

(52) U.S. Cl. .................... 709/246; 709/206

(58) Field of Classification Search ........... 709/209, 709/203, 206, 207, 218, 246, 205, 219, 202; 707/513, 1, 100, 10; 705/8
See application file for complete search history.

(56) References Cited

U.S. PATENT DOCUMENTS

| | | | | |
|---|---|---|---|---|
| 5,627,764 A | * | 5/1997 | Schutzman et al. ......... | 709/207 |
| 5,737,601 A | * | 4/1998 | Jain ........................... | 707/201 |
| 5,745,360 A | * | 4/1998 | Leone et al. ................ | 707/513 |
| 5,790,793 A | * | 8/1998 | Higley ........................ | 709/218 |
| 5,799,297 A | * | 8/1998 | Goodridge et al. ........... | 707/10 |
| 5,873,085 A | * | 2/1999 | Enoki et al. .................. | 707/10 |
| 5,963,966 A | | 10/1999 | Mitchell et al. ............ | 707/513 |
| 5,987,422 A | * | 11/1999 | Buzsaki ........................ | 705/9 |
| 6,064,977 A | | 5/2000 | Haverstock et al. ........... | 705/9 |
| 6,073,109 A | * | 6/2000 | Flores et al. ................ | 709/203 |
| 6,094,684 A | | 7/2000 | Pallmann .................... | 709/227 |
| 6,192,415 B1 | | 2/2001 | Haverstock et al. ........ | 709/245 |
| 6,301,621 B1 | | 10/2001 | Haverstock et al. ........ | 709/246 |

OTHER PUBLICATIONS

"Fulcrum's Surfboard—Search Technology for Internet," *Newsbytes Inc,*. Mar. 23, 1995.
Gage, Deborah, "*Fulcrum Technologies Tries to Stay Ahead of Microsoft,*" *Computer Reseller News*, 1996.

(Continued)

Primary Examiner—Paul H. Kang
(74) Attorney, Agent, or Firm—Pillsbury Winthrop Shaw Pittman LLP

(57) ABSTRACT

A system for enabling access to non-HTML files from a web browser. The system includes a database for storing non-HTML files. A system user requests a non-HTML file from a database using a web browser. The web browser transmits the request to a server via a HTTP server and module. The server locates and retrieves the document requested. The module translates the document to a format supported by the web browser. The HTTP server communicates the translated file to the web browser over a network. The web browser then presents the translated file to the system user. The server also includes a workflow module which distributes, routes and tracks documents according to predefined processes. The workflow module may execute the processes based on fields within the documents.

29 Claims, 3 Drawing Sheets

OTHER PUBLICATIONS

Balderston, Jim, "*Fulcrum Boosts Middleware Links to Web,*" *InfoWorld*, vol. 18, No. 25, Jun. 17, 1996.

Nadile, Lisa, "*PC Expo to Get Software Infusion,*" *PC Week*, vol. 13, No. 24, Jun. 17, 1996.

Gustavson, Ron, "*Compact Disc and Portable Webs,*" *E Media Professional*, vol. 9, No. 12, Dec. 1996.

Oski, Jonathan A., "*Lotus Notes 4.5 Branches into Internet, Intranets,*" *MacWEEK*, vol. 11, No. 8, Feb. 24, 1997.

Kramer, Matt, "*Tests Find Notes Client Will Ease Wondering, Database Access,*" *PC Week*, vol. 14, No. 21, May 26, 1997.

* cited by examiner

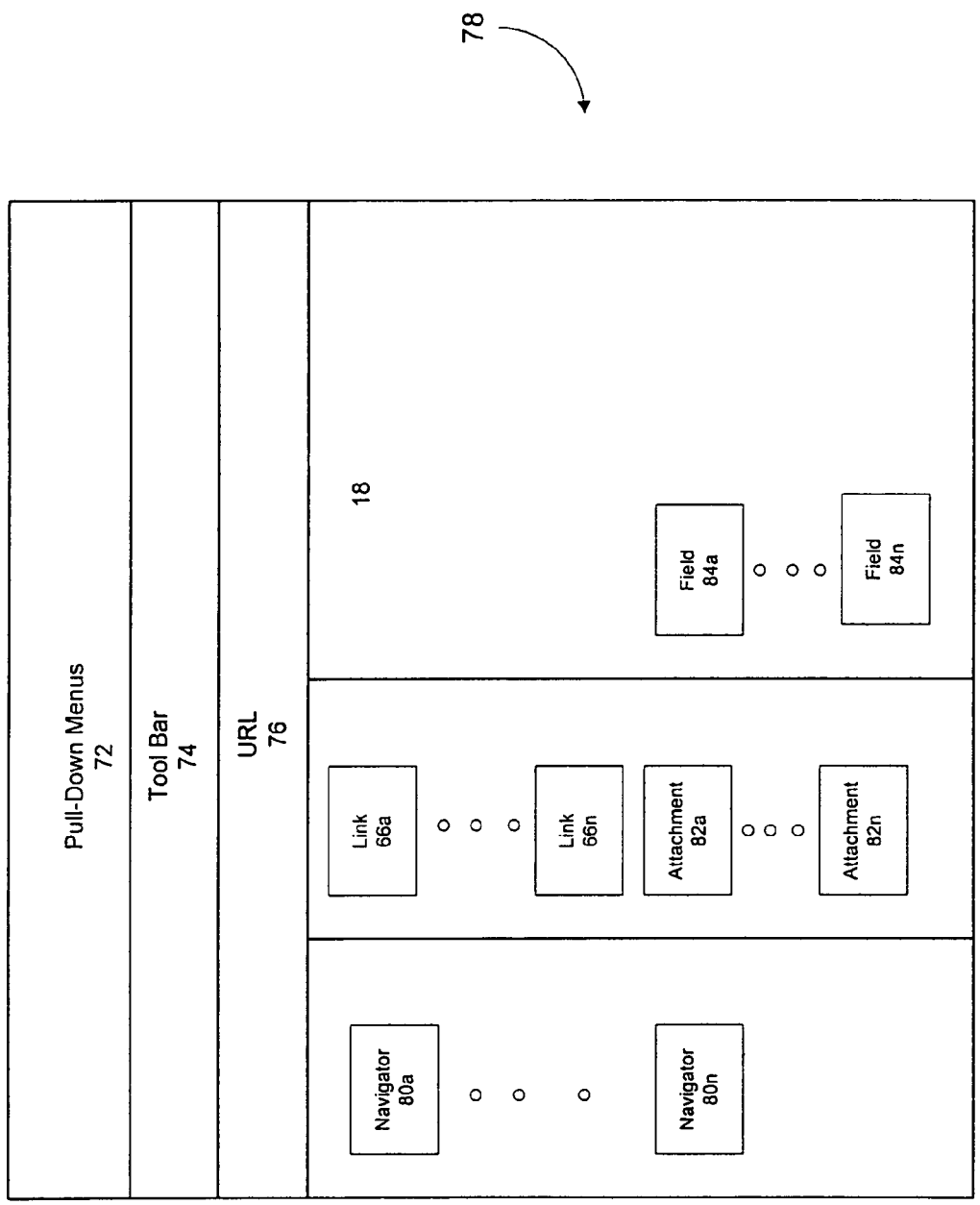

WEB SERVER WITH AUTOMATED WORKFLOW

RELATED APPLICATIONS

This application claims priority based on U.S. Provisional Patent Application Ser. No. 60/050,153, entitled "Web Server Application," U.S. Provision Patent Application Ser. No. 60/050,154, entitled "Web Site Creation Development Tool" and U.S. Provisional Application Ser. No. 60/050,155, entitled "Electronic Calendar With Group Scheduling," each filed Jun. 19, 1997. This application is also related to co-pending U.S. Patent Applications entitled, "Web Server Enabling Browser Access to HTML and Non-HTML Documents," U.S. patent application Ser. No. 09/100,131 filed herewith, "Web Server With Direct Mail Capability," U.S. patent application Ser. No. 09/100,130 filed herewith, "Web Server Providing Role-Based Multi-level Security," U.S. patent application Ser. No. 09/100,128 filed herewith, "Web Server With Unique Identification of Linked Objects," U.S. patent application Ser. No. 09/100,118 filed herewith, "Web Server With Ability To Process URL With Action Commands," U.S. patent application Ser. No. 09/100,117 filed herewith, "Web Server With Integrated Scheduling and Calendaring," U.S. patent application Ser. No. 09/100,119 filed herewith, "Web Server Providing HTML Pages Embedded With Non-HTML Views," U.S. patent application Ser. No. 09/100,120 filed herewith, and "Web Server Enabling Attachment of HTML and Non-HTML Files To Web Pages," U.S. patent application Ser. No. 09/100,121 filed herewith.

FIELD OF THE INVENTION

The invention relates to a web server that automates tasks based upon the occurrence of an event.

BACKGROUND OF THE INVENTION

Web browsers such as Netscape Navigator and Microsoft Internet Explorer are well known. Web browsers are software residing on a client (e.g., a personal computer). Via the browser, the client can communicate with a web server to enable access to and viewing of Hypertext Markup Language (HTML) documents. A web server typically includes a server (e.g., a UNIX- or Windows NT-based computer) connected to a network (e.g., the Internet, an intranet or other network), web server software configured with the host name of the server and the location of HTML files on the servers and the HTML files stored by that server.

In general operation, to access a web page, a user enters a request by specifying a uniform resource locator (URL) via the browser and hitting "Submit" (or another function key) and the URL is sent to the web server using HTTP. The web server responds by locating the requested HTML document and returning it to the browser. The browser receives the HTML document, interprets the HTML codes, translates them into a web page, and displays the web page. In this way, web browsers enable access to the vast number of HTML documents via the World Wide Web, the Internet or intranets. HTML generally is well known. A primary purpose of HTML is to describe how to format the text (and other content) of a web page. HTML uses tags to indicate how text of a web page should be displayed and to specify the URL of objects to which a page is linked. HTML files are commonly stored on a web server as standard text files with a HTM or HTML extension. Linking is a powerful feature of HTML. One drawback with HTML links is that links are created by coding a page with HTML tags to link it to other objects (e.g., another document or a specific location within a document). Therefore creating web pages and links requires a working knowledge of HTML and the time required to write HTML code a create a page and any desired links. Editing an HTML page or a link typically requires using HTML to edit the original web page or link. One significant problem with HTML links is that if a web page (or other object is linked to it) is moved or deleted any links to that page or object needs to be manually changed or a "file not found" message will appear when a user clicks on the link.

One limitation of web browsers and web servers is that they were designed primarily to access HTML documents. Browsers typically cannot cause a web server to retrieve and return non-HTML documents. This inhibits a user from accessing non-HTML documents, objects or databases from a web browser. Non-HTML objects, for example, may include non-HTML documents, stored views for documents in a database, identification files stored in a user directory and many other types of objects. Views provide a convenient way to index a plurality of documents. Identification files may comprise information about a system user (e.g., electronic mail address, role, profile, etc.).

One example of a non-HTML database is Lotus Notes. Lotus Notes is a popular software system, rich with a number of well-known functions. These functions. however, are typically accessed via a client terminal (loaded with Lotus Notes client software) communicating with a server (loaded with Lotus Notes server software). Because Notes is not an HTML-based application, it has not been practical to access objects in a Notes database via a standard web browser.

Standard web servers typically do not permit distributing, routing and tracking of documents based on a predefined process. Standard web servers generally do not maintain records for each document within a system (e.g., when a document has been accessed, who had accessed a document, etc.) or permit documents to be distributed to particular users according to a predetermined process.

Other drawbacks exist.

SUMMARY OF THE INVENTION

An object of the invention is to overcome these and other drawbacks in existing systems.

Another object of the invention is to provide a web server that can respond to requests from a web browser for either HTML or non-HTML documents and return the requested documents to the web browser.

Another object of the invention is to provide a web server with a workflow module which distributes, routes and tracks documents according to predetermined processes.

Another object of the invention is to provide a web server which automatically distributes, routes and tracks documents based on fields within the documents.

According to one embodiment of the invention, the system comprises a novel web server for a client/server network, where the client side is equipped with a standard browser. The server comprises standard web server functionality (e.g., HTTP server), an HTML translator, a server side software (e.g., Lotus Notes server software) and a database (e.g., a Lotus Notes database). Significantly, the database does not need HTML files. Preferably, the server receives a URL-based request from a browser via HTTP, the HTTP server and HTML translator determine the object (e.g., documents or databases) specified by the URL. retrieves that object, translates that object to HTML format and sends the HTML downloaded object to the client side browser for display.

According to one aspect of the invention, the server comprises a workflow module. The workflow module distributes, routes and tracks according to predefined processes. The workflow module automates tasks associated with transferring documents within a system.

BRIEF DESCRIPTION OF THE DRAWINGS

FIG. 3 is a view of a display in accordance with one embodiment of the invention.

DETAILED DESCRIPTION OF THE PREFERRED EMBODIMENTS

Figure 1:
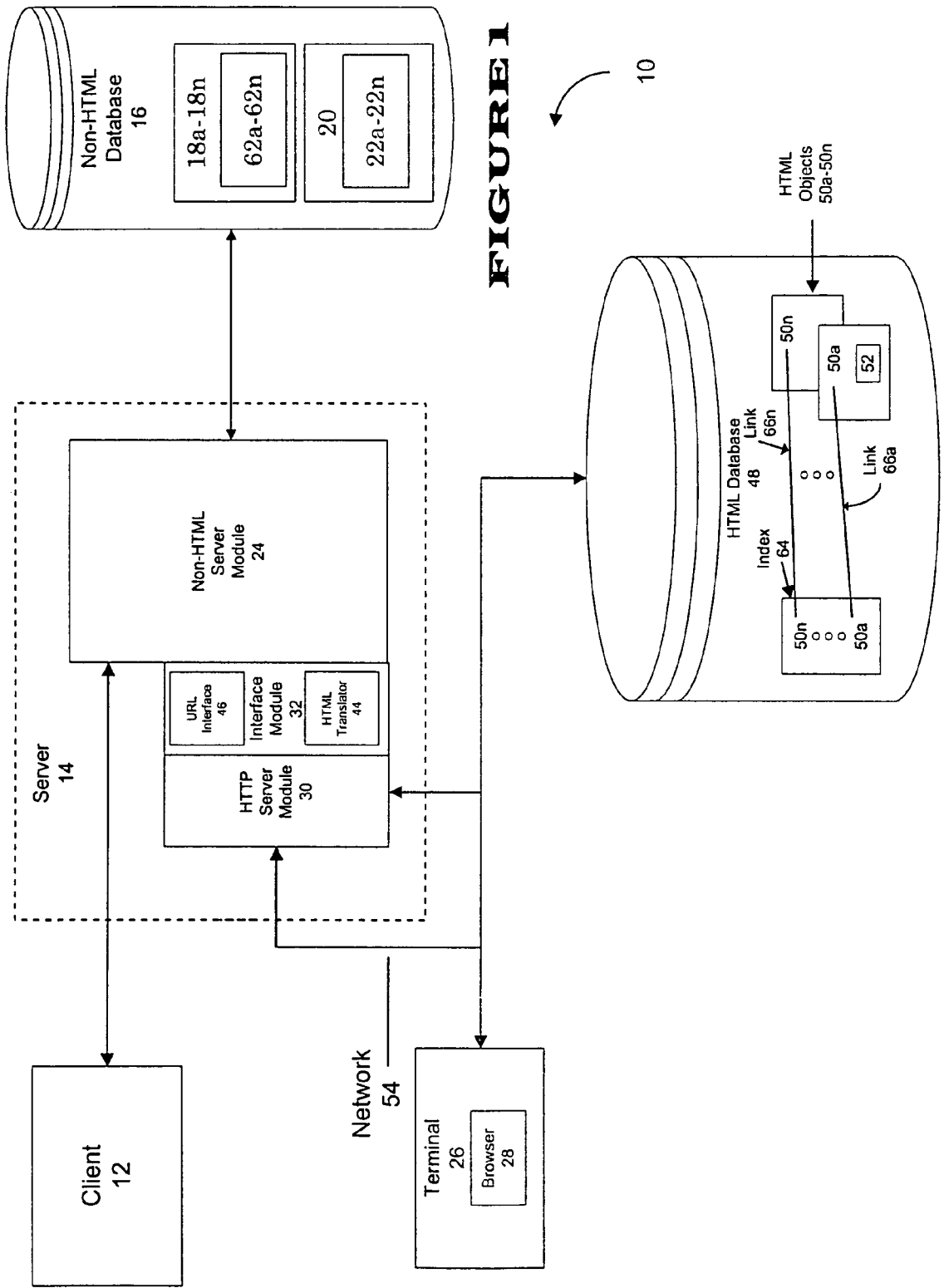
FIG. 1 is a block diagram illustrating an overall system in accordance with one embodiment of the invention.

As schematically illustrated in the block diagram of FIG. 1, one aspect of the invention relates to a client/server network system 10 enabling access to both HTML objects 50a–50n (e.g., HTML documents) and non-HTML objects 18a–18n using a web browser 28 residing on a terminal 26. Preferably web browser 28 supports Internet and Web protocols (e.g., HyperText Transfer Protocol (HTTP) and TCP/IP). The system may further comprise a client 12 to enable a non-browser client access to non-HTML server module 24 to retrieve non-HTML objects 18a–18n from non-HTML database 16.

A server 14 preferably comprises a HTTP server module 30, interface module 32 and non-HTML server module 24. As further illustrated in FIG. 1, the server side of system 10 may comprise a non-HTML database 16 in communication with server 14. Preferably, non-HTML database 16 stores one or more non-HTML objects 18a–18n, each at least some of which having one or more non-HTML fields 62a–62n, and a user directory 20. User directory 20 includes one or more user objects 22a–22n. User objects 22a–22n may include information about a user (e.g., electronic mail address, role, profile, etc.). Terminal 26 and server 14 can be in communication via a network 54 (e.g., Internet, Intranet or other network).

According to one aspect of the invention, a user submits a URL-based request for an object via browser 28. The request is passed to server 14 using HTTP (or other protocol). Server 14 receives the request via HTTP server module 30 and passes object location information to interface module 32 via URL, interface 46. URL interface 46 transmits that information to non-HTML server module 24. Non-HTML server module 24 retrieves the requested object and passes it to interface module 32. A HTMI translator portion 44 of interface module 32 translates the non-HTML object to a HTML representation of the requested object and the HTML representation is returned to browser 28 via HTTP server module 30.

System 10 also enables browser 28 to access HTML objects 50a–50n using HRTP server 30 or a conventional web server 56 in a known manner. A conventional editor may be used to edit HTML objects within the system. A conventional technique (e.g., a computer gateway interface (CGI)) may be used to store the edited HTML objects in the HTML database.

Thus, one advantage of the invention is that server 14 enables a browser 28 to request both HTML objects 50a–50n and non-HTML objects 18a–18n. Additional advantages derive from this capability. For example, one significant advantage is that the invention exposes powerful resources available in non-HTML databases 16 to a web browser 28 according to one embodiment of the invention.

Preferably, the invention comprises a Lotus Notes server. Advantageously, even with this embodiment a standard browser-based client may be used. As detailed below, Lotus Notes provides the non-HTML server module 24 a rich set of services that has made it a leading messaging and groupware platform. By expressing Notes capabilities to the Web (using a browser) via the present invention, Web developers can take advantage of an architecture that integrates database, security., directory, messaging, workflow, replication, and application development technology in a single platform heretofore lacking in browser based systems using HTML objects.

Lotus Notes, for example, is a robust system offering many features (e.g., forms, views, navigators, agents, folders, etc.). These resources in general are known, however. the ability to expose the features to a web browser is accomplished according to one aspect of the invention. Because Lotus Notes provides these and other features, Notes will be used to illustrate how features of a non-HTML database may be exposed to a web browser using the invention. Although Lotus Notes is used by way of example, the invention may be used with other non-HTML databases.

One advantage of the invention is that it enables browser 28 access to non-HTML objects (e.g., user objects 22a–22n) via a non-HTML server module 24. Through communication with the non-HTML server module 24, browser 28 is provided with additional functionality (i.e., functions supported by non-HTML server module). For example, non-HTML server module may comprise a security module. Because browser 28 retrieves non-HTML objects using non-HTML server module 24, the security module controls access to the non-HTML objects based on predetermined criteria. Therefore, this function is exposed to browsers.

For example, system 10 retrieves non-HTML, objects 18a–18n via non-HTML server module 24. By communicating with non-HTML server module 24, system 10 permits web browser 28 to utilize functions of non-HTML server module 24. For example, a system user may access non-HTML objects 18 from non-HTML database 16 (e.g., a Lotus Notes database). When non-HTML object 18a is retrieved using non-HTML server module 24, functions associated with non-HTML object 18a become available to the system user. For example. non-HTML object 18a may comprise an agent which transmits a message or facsimile notifying another system user that non-HTML object 18a has been accessed. The invention exposes this and other functions provided by non-HTML server modules 24 to browsers 28.

The system may use a bidirectional replication process to ensure that all system users are accessing the most recent versions of HTML objects 50a–50n. The replication process used is efficient because it is selective, can be scheduled. and can perform at the field-level. Selective replication enables administrators to replicate only a subset of data within the HTML database (for example, specific databases or HTML objects). Replication may be scheduled to run when networking costs are minimized. With field level replication, only those fields within HTML objects that are new or have been changed on either side of the replication process need to be replicated. With these sophisticated replication capabilities as a part of the infrastructure, developers can focus on creating Web applications which enable business processes within and across lines of business and corporate boundaries. The benefit to the user is easier manageability of databases and data integrity in all sites.

During replication, directory changes are also replicated, because the directory is simply another database in the invention, with the same structure and properties as a Web page library. Therefore, for example, discussion forums can be replicated, because discussions are simply another instance of a database.

Workflow is a programmed application that performs one or more tasks according to a pre-defined process (e.g., using agents or macros). Workflow operates to automate, for example, administrator and end-user tasks upon the occurrence of a predetermined event (e.g., a browser request for a particular document, modifying a particular document, etc.). For example, a system user may create an expense report for use by a company. Before the expense report may be used, however, it must be reviewed by a manager. Therefore, a process may be programmed into the server 14 in which all created expense reports are electronically mailed to a manager for review. Workflow may be applied to any document. For example, if a purchase order is created, the order may require approval from an accounting department. A process may be programmed into the server 14 to automatically mail the purchase order to personnel in the accounting department for approval. Other types of workflow may also be achieved, for example, transmitting an electronic mail message to a system user notifying the user that a document has been accessed, informing a manager that action is required on a particular document (e.g., a request for approval), etc.

Figure 2:
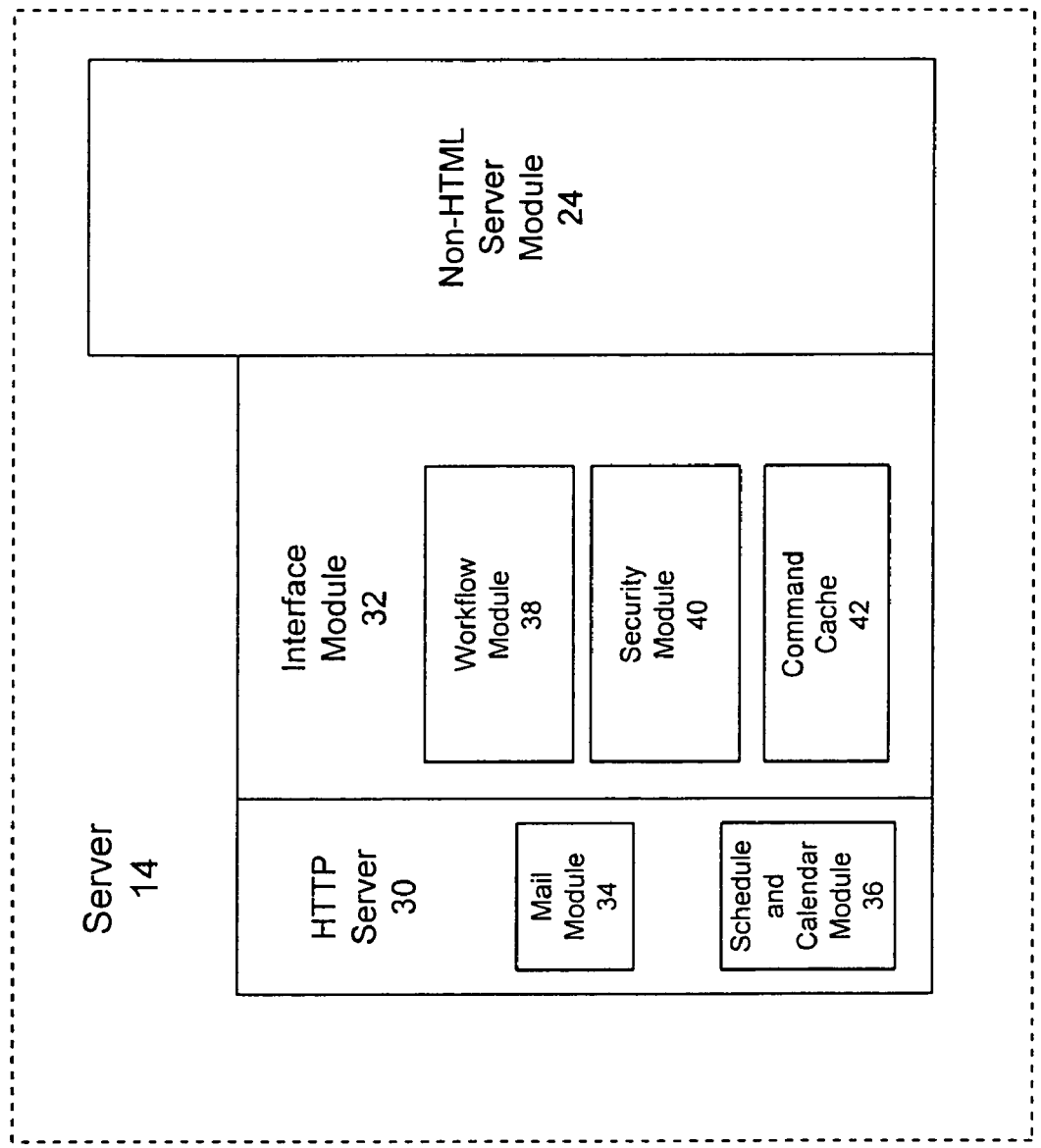
FIG. 2 is a block diagram illustrating an interface module in accordance with one embodiment of the invention.

As shown in FIG. 2, system 10 may also comprise a workflow module 38. Workflow module 38 distributes, routes and tracks documents according to a predefined process. For example, workflow module 38 may route documents to specific system users in a predetermined order. If a document must be reviewed by specific system users, workflow module 38 routes the document to the system users according to a routing process. If a system user does not act on the document before a predetermined time, workflow module 38 may notify the system user that action is required, forward the document to another system user, or perform another action identified in the routing process.

Additional features of the invention include quick and easy development and deployment of documents by providing point and click extended HTML design for forms, tables, user interface controls, image maps, links and summary views, for example. The system also provides URL interface access to database servers, such as Lotus Notes®. for example. The system acts on background agents for workflow monitoring and provides templates and design replication for application update and delivery.

The system also allows system users to design features (e.g., databases, forms, views, etc.) in a visual integrated development environment (IDE) using a browser. For example, a system user may create an employment application form. The form comprises various fields requiring system user input. To facilitate the creation of this form, another form having similar fields (e.g., work history form) may be used. For example. the system user may display both forms using Web browser 28. The work history form may have a field which the system user requires in the employment application form. To input the field from the work history form into the employment application form, the system user may simply select and "drag" the field (e.g., by using a conventional computer mouse) into the location in the employment application form and "drop" the field into the employment application form. Other known features of an integrated development environment may also be performed from a web browser due to the present invention.

For example, the Lotus Notes IDE provides developers with a forms-based metaphor that exploits the inventions object store, directory, security, workflow, and replication services. That is, developers using Notes have direct, programmatic access to these robust services, instead of resorting to limited interfaces between a scripting language and a set of services found in separate products and/or servers.

Moreover, the Notes development metaphor lends itself well to the types of business applications deployed on the Internet or on an intranet. For example, if a Notes designer client employs a set of intuitive and flexible application design elements (for example, forms, fields and views) that have great synergy with the page and link paradigms of the Web. Specifically, developers create forms and populate them with a variety of fields which interact with the user through agents, scripting language, and formulas. The layout and content of the form is automatically translated to HTML and delivered by the invention to the user for viewing in his or her Web browser. Once a form has been populated and saved, it is stored and processed as a page in the database, which can then be linked to other pages using the same hypertext linking mechanism so successfully exploited by the HTTP/HTML protocol set. The use of forms and fields lends itself to rapid application prototyping and development in at least three specific ways.

First, new views can be created on the fly. Because forms consist of fields. developers can sort pages based on the values of those fields on each page. For example, a Human Resources intranet application might include the ability to look up personnel information by first name, last name, department, manager, hire date, job level, etc. A sales management application might include the ability to sort all pages by customer, sales region, sales person, or revenue. If users request to see the information sorted a different way (for example, to sort all pages by social security number), all the developer has to do is create a view based on that field. All the links between all the pages are preserved.

Second, a single change in a form is inherited by all pages that use that form. Because pages in the database are based on a form, any changes to that form are automatically reflected on each page. This makes it easy to make global changes to some or all of the pages in the database. For example, if a company changes the logo it uses for one of its products the developer simply deletes the old logo from all the forms that use it and replaces it with the new logo. Even if hundreds or thousands of pages use that graphic image, only one change has to be made. This is a vast improvement over Web authoring systems that treat each page independently. so that a single change has to be repeated on every page.

Third, forms are used to create templates, which serve as a rich baseline of functionality for customized applications. The invention includes predefined sets of templates for the most common types of Web applications: discussion forums, document libraries. project management, and review and approval applications. These templates include all of the logic and formatting required for a working application, and can be deployed with no changes. Developers can also add new fields and logic to these templates. These templates also extend basic application development capabilities to power users as well.

Another advantage of the Notes IDE is its ability to reuse application objects from other applications. Forms (or parts of forms) from one application can be reused in new applications. For example, a registration form used to collect leads over the Internet can also be used for an intranet training course application. Whereas the Internet registration form might ask for e-mail address, telephone and fax number, the training class registration form might ask for cost center information. Both forms could use the same template, and the same validation and routing logic. Furthermore, if a change is made to the original template, it is automatically inherited by all the other forms that are based on it. For example, if an employee number changes from four digits to five digits, it might require that the validation logic on the template be changed. Any other forms based on that template will automatically include the new logic as well, saving developers significant time and effort.

Collaboration sites handle the activity that occurs among people and the information that they handle. Typical collaborative activities include discussions and brainstorming. review and approval cycles, human resource employee reviews and candidate interview processes. The creation of most content is a collaborative process: creating a press release, white paper, or even a job posting normally involves more than one person. Providing customer service after a sale has been made is also a collaborative process that involves the customer and at least one other person inside a company. That is, collaboration is an integral activity that surrounds content and commerce. There is very little, if any, Web technology in place to effectively support collaboration.

One embodiment of the invention relates to a Web application server, its basic architecture and the integral services that lend themselves to the rapid development and deployment of collaborative applications that support content and commerce.

To realize these and other capabilities, server 14 may further comprise various modules as depicted in FIG. 2. For example, HTTP server 30 may further comprise a mail application module 34 and a scheduling and calendaring application module 36. Interface module 32 may further comprise a workflow module 38. command cache 42 and a security module 40.

The additional components shown in FIG. 2 enable various capabilities to be provided to enhance the advantages of the system. Each of these components and examples of the added capabilities is described below.

Unlike basic Web-based customer service applications, the invention workflow goes beyond the publishing of customer information to allow true customer-to-business interaction in which a specific business process is supported. For example, the advanced customer support system may be used to: initiate an inquiry, process the inquiry, assign the inquiry, notify the appropriate customer representative, and monitor the status of the inquiry.

Benefits of the invention range from minimizing the time and cost required to develop and deploy interactive Web applications, to actually achieving company goals that were once virtually impossible without the widespread use of the Internet.

There are several requirements of companies both large and small, regarding Web applications:

Interactivity. Much more than static HTML document delivery is required to enable interactive applications, especially in a supply chain management setting. The present invention provides the template forms and development tools to rapidly develop interactive applications.

Inter-enterprise connectivity. The most effective Web applications extend throughout a company's supply chain, from suppliers and business partners all the way to customers. The present invention lets users extend applications across their entire supply chain through the use of replication and workflow.

Multiple layers of security. Many of the Web applications that companies want to develop require multiple layers of security, from basic server access to customized/personalized pages, to page and field-level read/write authority. The present invention's access control security satisfies this requirement and enables companies to establish roles-based access to content.

Cost and development resources are a factor. Whereas initial Web site costs for publishing are typically small regardless of the product used, cost has become an important consideration when developing actual Web applications. The present invention helps minimize cost.

An example will be used for convenient reference.

Company A (a bank) desires to streamline customer service and improve existing business processes with their major commercial customers. They partnered with Company B (a consulting firm) to create an advanced customer support ("ACS") system to address those requirements. The system allows customers to have access to issue submission and tracking information, check imaging applications, customer-support knowledge bases, and other application functionality through a Web client. The system includes built-in workflow capabilities that manage the assignment and notification of key personnel of company A, and automate messaging, faxing, and paging. Customer issue status and service level reporting information is accessed via the Internet.

In addition to the above features. system 10 also provides other functions. For example, system 10 provides integrated mail application module 34 and scheduling and calendaring application module 36. System 10 uses web browser 28 to permit reading, creating, editing, etc. of electronic mail messages and calendaring and scheduling of events. The calendaring and scheduling application module 36 permits the system user to invite other invitees to the event (e.g., system users, conference rooms, audio/visual equipment, etc.). For example, using the calendaring and scheduling feature, a system user schedules an event. The system user may then retrieve a form which serves as a template for creating an electronic mail message (e-mail). The e-mail is composed in cooperation with the scheduling application and therefore identifies information concerning the event (e.g., date, time, location, etc.). The system user addresses the e-mail to the invitees using electronic mail addresses stored in a user directory. The user directory may include additional information (e.g., user role, profile, etc.). The e-mail may be provided with a view inquiring whether the invitee accepts, declines, etc. If an invitee accepts, the system will automatically schedule the event in the invitee's calendar. The system user may also input additional information (e.g., textual information. attachments, etc.).

The messaging, calendaring and scheduling function are performed directly through the web browser. A separate window or application does not need to be opened. Prior browser-based systems require separate mail, schedule and calendar applications to be opened in a separate "windows."

One advantage of the server 14 of the present invention as compared with other Web servers is that it exploits the Web to handle the activity that is driven by the information that is posted on the Web site. Two core services of the invention that make this possible are messaging and workflow.

The server supports major industry messaging protocols and Application Programmer's Interfaces (APIs). The invention provides a backbone messaging platform with robust message transfer agents (MTAs) for SMTP, X.400, cc:Mail, and Notes Mail. Messaging services support e-mail clients using industry standards, including Post Office Protocol v3 (POP3) and Internet Mail Access Protocol v4 (IMAP4). The invention also supports other broadly deployed protocols, including Vendor Independent Mail (VIM), and Messaging API (MAPI).

The invention also includes group calendaring and scheduling functionality, and will support standard calendar and schedule protocols as they emerge.

The combination of messaging with calendaring and scheduling functionality provides developers with the tools to create Web applications incorporating workflow. Business processes that have time-sensitive actions and tasks associated with multiple users can be rapidly enabled. For example, a Web application can intelligently route messages and forms to users based on a variety of business relevant conditions (for example. user, schedule, time, priority). Also, a Web application can be designed to examine a group of users' calendars, determine the optimal schedule to ensure business processes are completed, and notify each user of impending work.

Company A can take advantage of this messaging and workflow functionality to enable a sophisticated set of processes for managing customer issues. Issue status requests may be routed to the appropriate Company A service representative based on a combination of parameters including the inquirer's company, his or her service level agreement and the priority of the inquiry. The invention can efficiently handle non-routine occurrences such as re-routing messages destined for absent service representatives by examining their schedules. Also, issue status requests that exceed a specific time threshold can automatically trigger escalation to managers via e-mail or pager.

The system also provides role-based, multi-level security module 40 for controlling access to objects within the system. The system enables an authorized individual to assign users a defined role. Each role may have various privileges based on the priority level of the role. Priority levels may comprise a read only privilege, read and edit privileges, read public information only privileges, etc. For example a system administrator may have complete privileges to all objects within the system. A law level employee user, however, may have read only privileges for some objects an/or no access to others. These security features may extend to fields within a document. For example, a document containing a person's sales records may include a buyer field. A system user accessing the document may be required to have a certain priority level to view the buyer field. If the system user does not have this priority level, the system user will not be permitted access to that information (e.g., the buyer field may not be displayed). This permits system user's access to be unrestricted controlled on a field-by-field bases whereas prior browser-based systems typically either deny or grant access to a web page or site area.

Additionally, the system provides for high-level security authentication. Before a system user is granted access to an object within the system, the system may authenticate the system user. This may be done by assigning an identification and password to the system user. A system user attempting to enter the system must first enter the user identification and password. If the identification and password do not match the identification and password stored in the system, the system user is not authenticated and access is denied.

Another feature is dynamic generation of content based on a who the system user is. Dynamic generation occurs because each time a user requests a non-HTML object, that object is translated (even if the object has been requested and translated previously). For example, a non-HTML object may contain a date field. Therefore, to update the field, the system translates the non-HTML, object each time it is requested.

Dynamic generation may also apply to security. For example, a document may contain certain fields that are access controlled, whereby, depending on who the user is (e.g., based on the user's role) one or another field may be displayed. If a user's role changes (e.g., access privileges revoked), dynamic generation allows the system to update a user's role with the current privileges and restrict access as required.

There are at least three different ways to describe security, each having its own access methods and protocol. One embodiment of the invention provides a solution for each of these different security levels. These are:

Authentication: Confirming who a user is with user names and passwords via a directory;

Authorization: Allowing you to do certain things through Access Control Lists ("ACL"); and Encryption: Protecting what you do through Secure Sockets Layer ("SSL").

Building upon such standard Web security as Secure Sockets Layer, the invention has the ability to granularly control a Web application's delivery of content based on how a user will participate with the application: this is referred to as roles-based access. This feature provides great value to organizations that require secure Web application functionality to enable sensitive business processes. The invention supports SSL which complements ACL. Using its integrated ACI, web server 14 (e.g., a Lotus Domino Server) can control the access and authorization to sensitive HTML objects to only those with the appropriate privileges. For even greater access control granularity, specific fields in a page can be secured and delivered only to specified users.

Access to a page or a field is only part of the security model of the invention. ACL technology also controls the level of functionality each user has. That is, some users are able to modify or update information on an existing Web page directly from a browser. Depending on the page or field that a user is reading, the invention determines the appropriate role:

No Access: A user at this level has no access to the database on the Web site or its associated views and HTML objects. This allows Web developers to easily hide sensitive information as a default function of the Web site. Developers can also hide functionality (for example. buttons, menu items).

Depositor: A depositor can only write to a database. This level is useful for Web-based anonymous ballot boxes or surveys.

Reader: A reader has read-only access to pages on the Web site.

Author: In addition to reading pages, authors can create and post new pages to the Web site. Typically, authors can also edit and delete those Web pages they themselves created.

Editor: Editors can read, write, update and delete pages created by others.

Through tight integration of security and directory services, developers can easily apply access controls by an individual user or group of users. This role-dependent content delivery is transparent to the user.

The value of roles-based access functionality can be illustrated with an application common to most organizations. A Human Resources department wishes to develop a Web application to post job opportunities. Most employees will have reader access to these pages. In addition, hiring managers will have author access so that they can also post new jobs to the database, as well as go back and modify postings that they themselves have authored. Human Resource staff might enjoy editor access, which gives them the ability to make changes to any posting on the site. And perhaps, Finance Department staff might have reader access to all pages, but also have editor access to the salary field, giving them the ability to make changes to just one part of each page. The invention exposes this and other functions provided by non-HTML server modules 24 to browsers 28.

FIG. 3 illustrates a HTML object 50a in accordance with one embodiment of the invention. System 10 permits a representation of non-HTML objects 18a–18n to be embedded within HTML objects 50a–50n. For example, a system user may retrieve HTML object 50a. The system user may request non-HTML object 18a to be displayed within HTML object 50a. System 10 retrieves non-HTML object 18a. Non-HTML object 18a is translated to a HTML representation 50n of non-HTML object 18a. System 10 uses HTML representation 50n to embed HTML representation 50n in HTML object 50a. FIG. 3 shows HTML object 50a with non-HTML objects (and other objects) embedded therein (e.g., pull-down menus 72, a tool bar 74, a URL identifier 76, a form 78, navigators 80, links 66, attachments 82 and fields 62). After non-HTML object 18a is embedded within HTML object 50a, HTML object 50a may be saved as another object which includes embedded non-HTML object 18a.

Preferably, HTML representation 50n comprises a table tag and HTML formatting tags. HTML tags are codes used in a HTML object that determine the layout of a HTML object. Views may comprise links to other views. For example, an object may contain a graphical representation of a view. The representation provides a link to the view which is retrieved when a user "clicks" on the representation. When a system user "clicks" on the representation, a URL request for that view is transmitted to HTTP server module 30. HTTP server module communicates the request to URL interface 46 of interface module 32. URL interface 46 converts the request into a format supported by non-HTML server module 24. Non-HTML server module 24 locates and retrieves the view requested and transmits the view to interface module 32. HTML translator 44 translates the view into HTML and passes the translated view to HTTP server module 30. HTTP server module 30 communicates the view requested to browser 28 for presenting to the system user. This process may be repeated for each additional view requested by the system user.

Navigators may also be embedded within HTML objects 50a–50n. Navigators assist system users in moving through documents. Navigators may be graphical representations or text that identify other portions of a document, other documents, etc. For example, a non-HTML object is requested by a system user. The non-HTML document may comprise a navigator. Module 30 translates the non-HTML object and navigator into HTML object 50a.

Other embodiments and uses of the invention will be apparent to those skilled in the art from consideration of the specification and practice of the invention disclosed herein. For example, the invention may apply to other client side applications which are based on URLs (e.g., news readers). The invention may also translate documents to formats other than HTML. The specification and examples should be considered exemplary only. The scope of the invention is only limited by the claims appended hereto.

What is claimed is:

1. A server system facilitating one or more object management tasks, of a server, associated with one or more non-markup language objects, the system comprising:
   a server;
   one or more databases, in communication with the server, comprising one or more non-markup language objects;
   a workflow module that facilitates one or more object management tasks of the server, associated with the one or more non-markup language objects according to one or more predefined calendaring and scheduling functions, wherein the workflow module notifies at least one user that at least one action is required for the one or more non-markup language objects; and
   a markup language translator that translates the one or more non-markup language objects to representations of one or more markup language objects in order to enable said at least one user to execute said at least one action notified by the workflow module.

2. The system of claim 1, wherein the workflow module performs the one or more tasks based on an occurrence of one or more events.

3. The system of claim 2, wherein the workflow module distributes the one or more objects according to the predefined process.

4. The system of claim 1, further comprising a notifying module that notifies the system user that an action is required for the one or more objects.

5. The system of claim 1, wherein the server comprises a HTTP server module.

6. The system of claim 1, wherein the server comprises a non-markup language server module.

7. The system of claim 1, wherein the workflow module routes the one or more objects according to the predefined process.

8. The system of claim 1, wherein the workflow module tracks the one or more objects according to the predefined process.

9. A server system facilitating one or more object management tasks, of a server, associated with one or more non-markup language objects, the system comprising:
   server means;
   database means, in communication with the server means, for storing one or more non-markup language objects;
   workflow means for facilitating one or more object management tasks of the server, the workflow means associated with the one or more non-markup language objects according to one or more predefined calendaring and scheduling functions, wherein the workflow means notifies at least one user that at least one action is required for the one or more non-markup language objects; and
   markup language translating means for translating the one or more non-markup language objects to representations of one or more markup language objects in order to enable said at least one user to execute said at least one action notified by the workflow means.

10. The system of claim 9, wherein the workflow means performs the one or more tasks based on an occurrence of one or more events.

11. The system of claim 9, wherein the workflow means distributes the one or more non-markup language objects according to the predefined process.

12. The system of claim 11, further comprising notifying means for notifying a system user that an action is required for the one or more objects.

13. The system of claim 9, wherein the server means comprises a HTTP server module means for communicating with one or more markup language database means.

14. The system of claim 9, wherein the server means comprises non-HTML server module means for communicating with the non-markup language database means.

15. The system of claim 9, wherein the workflow means routes the one or more objects according to the predefined process.

16. The system of claim 9, wherein the workflow means tracks the one or more objects according to the predefined process.

17. A method for facilitating one or more object management tasks, of a server, associated with one or more non-markup language objects, the method comprising the steps of:
 storing one or more non-markup language objects in one or more databases;
 creating a workflow process to be applied to the one or more non-markup language objects, wherein the work flow process notifies at least one user that at least one action is required for the one or more non-markup language objects;
 determining a workflow process to apply to one or more non-markup language objects;
 applying the workflow process to the one or more non-markup language objects, wherein the workflow process performs one or more object management tasks relating to the one or more non-markup language objects according to one or more predefined calendaring and scheduling functions; and
 translating the one or more non-markup language objects to representations of one or more markup language objects in order to enable said at least one user to execute said at least one action notified by the workflow process.

18. The method of claim 17, further comprising the step of applying the workflow process according to a predetermined process.

19. The method of claim 17, further comprising the step of distributing the one or more non-markup language objects according to the workflow process.

20. The method of claim 19, further comprising the step of notifying a system user that an action is required for the one or more objects.

21. The method of claim 17, further comprising the step of performing the workflow process based on an occurrence of one or more events.

22. The method of claim 17, further comprising the step of routing the one or more non-markup language objects according to the workflow process.

23. The method of claim 17, further comprising the step of tracking the one or more non-markup language objects according to the workflow process.

24. An electronic storage medium having code embodied therein for causing a processor to facilitate one or more object management tasks, of a server, associated with one or more non-markup language objects, the medium comprising:
 communicating code that causes a processor to enable a server to communicate with one or more databases comprising one or more non-markup language objects; and
 workflow facilitating code that causes a processor to facilitate workflow of one or more object management tasks of the server, associated with the one or more non-markup language objects according to one or more predefined calendaring and scheduling functions, wherein the workflow process notifies at least one user that at least one action is required for the one or more non-markup language objects; and
 markup language translating code that causes a processor to facilitate translating the one or more non-markup language objects to representations of one or more markup language objects in order to enable said at least one user to execute said at least one action notified by the workflow process.

25. The medium of claim 24, wherein the workflow facilitating code performs the one or more tasks based on an occurrence of one or more events.

26. The medium of claim 24, wherein the workflow facilitating code distributes the one or more non-markup language objects according to the predefined process.

27. The medium of claim 26, further comprising notifying code that causes a processor to notify a system user that an action is required for the one or more non-markup language objects.

28. The medium of claim 24, wherein the work flow facilitating codes routes the one or more objects according to a predefined process.

29. The medium of claim 24, wherein the work flow facilitating code tracts the one or more objects according to the predefined process.

* * * * *

UNITED STATES PATENT AND TRADEMARK OFFICE
CERTIFICATE OF CORRECTION

PATENT NO. : 7,082,475 B2  Page 1 of 1
APPLICATION NO. : 09/100129
DATED : July 25, 2006
INVENTOR(S) : Paul Haverstock et al.

It is certified that error appears in the above-identified patent and that said Letters Patent is hereby corrected as shown below:

Title Page:

Item (56), References Cited, U.S. PATENT DOCUMENTS, please add:

| | | |
|---|---|---|
| 5,299,304 | 3/1994 | Williams |
| 5,513,323 | 4/1996 | Williams |
| 5,530,852 | 6/1996 | Meske, Jr. et al. |
| 5,675,507 | 10/1997 | Bobo II |
| 5,774,670 | 6/1998 | Montulli |
| 5,819,263 | 10/1998 | Bromley et al. |
| 5,819,302 | 10/1998 | Nielsen |
| 5,842,177 | 11/1998 | Haynes et al. |
| 5,848,410 | 12/1998 | Walls et al. |
| 5,862,325 | 1/1999 | Reed et al. |
| 5,867,822 | 2/1999 | Sankar |
| 5,930,474 | 7/1999 | Dunworth et al. |
| 5,944,791 | 8/1999 | Scherpbier |
| 5,956,483 | 9/1999 | Grate et al. |
| 5,956,486 | 9/1999 | Hickman et al. |
| 5,991877 | 11/1999 | Luckenbaugh |
| 6,006,228 | 12/1999 | McCollum et al. |

Signed and Sealed this

Seventeenth Day of October, 2006

JON W. DUDAS
*Director of the United States Patent and Trademark Office*